Feb. 6, 1968     E. P. WHITLOW     3,367,137
ABSORPTION REFRIGERATION GENERATOR
Filed April 20, 1966
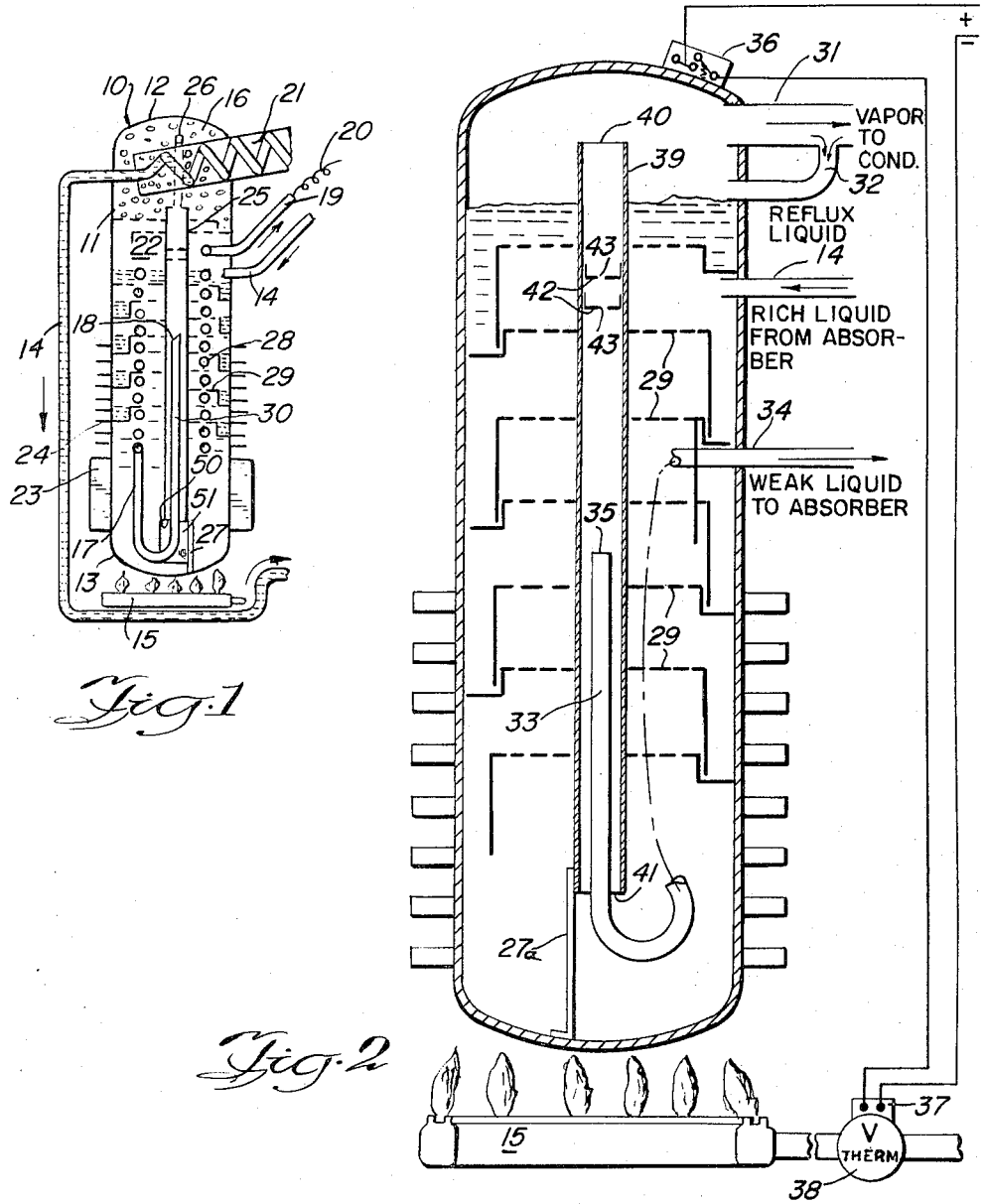
INVENTOR
Eugene P. Whitlow
BY
Hofgren, Wegner, Allen, Stellman & McCord
ATTORNEYS United States Patent Office 3,367,137
Patented Feb. 6, 1968

3,367,137
ABSORPTION REFRIGERATION GENERATOR
Eugene P. Whitlow, St. Joseph, Mich., assignor to Whirlpool Corporation, a corporation of Delaware
Filed Apr. 20, 1966, Ser. No. 543,844
7 Claims. (Cl. 62—497)

ABSTRACT OF THE DISCLOSURE

An absorption refrigeration refrigerant generator having a refrigerant weak liquid tube with its inlet positioned substantially above the bottom of the generator for maintaining a minimum amount of refrigerant weak liquid in the generator. The inlet portion of the refrigerant weak liquid tube is enclosed within a larger diameter tube which extends from substantially below the refrigerant weak liquid level to adjacent the top of the generator and is provided with metering baffles to limit gaseous refrigerant from entering the refrigerant weak liquid tube.

This invention relates to a generator for an absorption refrigeration system.

The generator of this invention is used as a part of an absorption refrigeration system for generating or evolving refrigerant gas such as ammonia for condensing into liquid refrigerant by heating a rich liquid to produce the refrigerant gas and a weak liquid.

One of the features of this invention is to provide an improved generator for an absorption refrigeration system having improved means for providing at least a minimum depth of weak liquid in the generator at the portion thereof where heat is applied in order to prevent heat damage to the generator without corresponding interruption of weak liquid flow from the generator and to facilitate system start-up.

Another feature of this invention is to provide such a generator having conduit means for flowing weak liquid therefrom with an entrance end protected by being located within a tubular member which has one end open to a vapor space at the top of the generator and a lower end open to a weak liquid portion adjacent the bottom of the generator to receive weak liquid therefrom.

Yet another feature of the invention is to provide such a structure in which the tubular member is generally vertical and carries spaced rectifier plates over which absorption liquid flows from an upper rich liquid section in contact with the vapor space downwardly to a weak liquid section adjacent the area where heat is applied.

A further feature of the invention is to provide such a structure in which the conduit means for flowing weak liquid from the generator passes upwardly through the spaced rectifier plates in heat exchange relation with rich liquid flowing downwardly across the plates.

Other features and advantages of the invention will be apparent from the following description of certain embodiments thereof taken in conjunction with the accompanying drawings. Of the drawings:

FIGURE 1 is a semi-diagrammatic vertical sectional view through a generator embodying the invention.

FIGURE 2 is a view similar to FIGURE 1 illustrating a second embodiment of the invention.

In the embodiment of FIGURE 1 the generator 10 comprises a generally vertical cylindrical shell 11 adapted to contain liquid and having a top 12 and a bottom 13. Means are provided including a pipe 14 for flowing absorption liquid rich in dissolved refrigerant into the shell 11. As can be seen from FIGURE 1, this rich liquid pipe 14 is nearer the top 12 than the bottom 13.

The generator also includes means for supplying heat at the bottom 13 of the shell with this heat supply means, as illustrated, including a gas burner 15. The heat as is customary in absorption generators boils or expels refrigerant vapor from the absorption liquid which thereupon bubbles upwardly in the shell 11 to be collected in the vapor space 16 at the top 12 of the shell. This expelling of refrigerant vapor by the applied heat converts the rich liquid flowing into the shell 11 through the pipe 14 and downwardly within the shell into a weak liquid. As the heat is applied at the bottom 13 of the generator shell 11, the weakest liquid is located closest to the bottom 13.

The resulting weak liquid is conveyed from the generator 10 by means of a pipe 17 having an entrance end 18 and including in the weak liquid pipe portion 19 externally of the shell 11 a flow restrictor or capillary 20.

Vapor from the top vapor space 16 is conducted from the generator by way of an upwardly inclined conduit 21 which functions as a rectifier. In this embodiment the conduit 21 is exposed to the ambient atmosphere so that some of the vaporized absorption liquid which is normally water is condensed and drops back into the liquid body 22 within the shell 11. As can be seen from FIGURE 1, the rectifier conduit 21 communicates with the vapor space 16 within the shell 11.

In order to preheat the rich liquid entering the generator by way of the conduit 14 this conduit is preferably in heat transfer relationship with the vapor flowing out the rectifier conduit 21, as shown in FIGURE 1.

In the type of generator illustrated in FIGURE 1 as well as in FIGURE 2 the shell 11 beneath the vapor space 16 is substantially filled with liquid to at or above the shell end of the rich liquid pipe 14. As mentioned previously, the generator is heated by the gas heater 15 at the bottom end thereof and heat transfer to the liquid within the shell is aided by the bottom vertical fins 23 and horizontal fins 24 located thereabove.

Located within the shell 11 is an essentially vertical tubular member 25 that in the illustrated embodiments is located at substantially the central vertical axis of the vertical cylindrical shell 11. This tubular member 25 has an open upper end 26 in the vapor space 16, and a screen 51, a support member 27, and an open lower end 50 in the weak liquid lower part of the generator adjacent the bottom 13 for flow of liquid into the tubular member by way of this open lower end 50.

Mounted on and carried by the vertical tubular member 25 are vertically spaced rectifier plates 29 arranged so that the descending rich liquid from the pipe 14 flows back and forth across the successive plates 29.

The weak liquid pipe 17 previously mentioned conveys weak liquid from the generator by way of the external pipe portion 19 and capillary 20. The weak liquid pipe 17 within the shell 11 is arranged in vertically spaced adjacent helical coils so that weak liquid flows upwardly through the coils and rectifier plates in countercurrent heat transfer relationship to the descending rich liquid that enters shell 11 from the rich liquid pipe 14.

A generator including the structure described to this point is disclosed in greater detail and claimed in the copending application of B. A. Phillips Serial No. 502,186, filed October 22, 1965, now Patent No. 3,323,323 and assigned to the same assignee as the present application.

One of the dangers in operating an absorption refrigeration generator of this type wherein rich liquid flows to the generator, heat is applied to a portion of the generator to evolve absorbed refrigerant and generate weak liquid and the weak liquid is conducted from the generator, is the danger of heat damage to the generator in the event of any interruption of rich liquid flow to the generator without corresponding interruption of weak liquid flow from the generator. The generator of this invention is designed to avoid such heat damage in the event of such interruption of rich liquid flow to the generator, and to provide a desired minimum volume of weak liquid in the generator to facilitate system start-up after a shut-down period.

Such heat damage in the generator of this invention is avoided and system start-up is facilitated by providing a conduit system in which weak liquid is drawn from the bottom of the generator where heat is applied and where the liquid is substantially at its weakest but with means for providing a minimum weak liquid level in the generator which is maintained even if rich liquid flow to the generator should be interrupted. Thus, in the embodiment of FIGURE 1 the minimum level is accomplished by locating the entrance end 18 of the weak liquid pipe 17 within the tubular member 25 at a desired elevation which will determine this minimum liquid depth. As can be seen from FIGURE 1, the entrance end 18 is well above the bottom 13 of the shell 11 and the area where the gas burner 15 is located. With this arrangement, in the event flow of rich liquid into the generator from the pipe 14 is interrupted, weak liquid will continue to flow out the pipe 17 until the liquid level within the shell 11 falls below the entrance end 18 of the weak liquid pipe 17. Thereafter, only vapor which continues to be evolved from the weak liquid can flow through the weak liquid conduit 17 by way of the entrance end 18.

Locating the entrance end 18 of the weak liquid conduit 17 within the tubular member 25 is of very great importance as it provides that weak liquid from the bottom 13 of the shell 11 will be supplied to the entrance end 18 even though this end is positioned well above the bottom 13 of the shell. This occurs because the open bottom end 50 of the tubular member 25 is positioned to receive substantially the weakest liquid in the shell. The bottom of the tubular member 25 therefore serves as an extension of the entrance end 30 of this weak liquid pipe 17 to receive weak liquid from the bottom of the shell while still insuring that the weak liquid level cannot fall substantially below the entrance end 18 of the weak liquid pipe 17.

The embodiment of FIGURE 2 is also semi-diagrammatic and is quite similar to the embodiment of FIGURE 1. Thus, in this embodiment the same rectifier plates 29 are used but are shown in somewhat more detail. In this embodiment the upper rectifier conduit is identified at 31 and the flow of reflux liquid from this rectifier is indicated by the pipe 32. In this embodiment of FIGURE 2 the weak liquid pipe 33 is substantially the same as pipe 17 except that the series of coils similar to the helical coils 28 are omitted. The weak liquid pipe 33 has an exit portion 34 externally of the shell 11 that is similar to the exit portion 19.

In this second embodiment of FIGURE 2 safety means are illustrated diagrammatically for stopping operation of the generator after the liquid level has fallen to the minimum depth determined by the entrance end 18 of the weak liquid pipe 17 in FIGURE 1 and the entrance end 35 in the embodiment of FIGURE 2. Thus there is provided in the embodiment of FIGURE 2 thermoresponsive means 36 in the form of a heat activated switch in thermal communication with the vapor space 16 end of the shell 11. As mentioned earlier, once the liquid level has fallen to the predetermined minimum depth on interruption of flow of rich liquid to the generator the weak liquid in the bottom of the generator continues to boil. With increasing amounts of refrigerant being thereby expelled from the weak liquid the boiling point thereof rises which makes the vapor in the vapor space 16 become hotter. When an abnormally high temperature is reached in this vapor space 16 the switch 36 is activated to energize and close a solenoid valve 37 in the fuel supply line 38 to the burner 15. Therefore, the heat activated switch 36 operates as a further safety factor to stop operation of the generator in the event the interruption of rich liquid flow to the generator is not corrected.

Also provided in the generator, but described only in connection with the embodiment of FIGURE 2, are means for retarding reabsorption of vapor from the vapor space 16 into the weak liquid within the vertical tubular member 39 which is spaced from the bottom of the shell by means including a support member 27a. Because this tubular member, as in the first embodiment, is open to the vapor space 16 at the upper end 40 and to the weak liquid at the bottom end 41, weak liquid entering the member 39 through this bottom end can absorb refrigerant vapor from the vapor space 16 when it enters the tube 39 through its upper end 40. This reabsorption of refrigerant vapor into the weak liquid within the member 39 is retarded by providing at least one, and preferably a plurality, of restricted flow orifice members 42 within the tubular member 39 above the entrance end 35 to the weak liquid pipe 33. In the illustrated embodiment these members 42 are metal plates fitted within the tube 39 and each containing a small opening 43 which will permit pressure equalizing fluid flow therethrough but only at a restricted rate.

Having described my invention as related to the embodiments shown in the accompanying drawings, it is my intention that the invention be not limited by any of the deails of description, unless otherwise specified, but rather be construed broadly within its spirit and scope as set out in the accompanying claims.

The embodiments of the invention in which an exclusive property or privilege is claimed are defined as follows:

1. A generator for an absorption refrigeration system, comprising: a liquid containing shell having a bottom; means for flowing absorption liquid rich in dissolved refrigerant into an upper part of said shell; means for supplying heat to a lower part of said shell to expel refrigerant vapor from said rich liquid thereby producing weak liquid in said lower part; a tubular member in said shell having an open lower end adjacent said shell bottom to receive weak liquid from adjacent said bottom and an upper end spaced a substantial distance above said bottom; and conduit means for flowing weak liquid from said shell having an entrance end within said tubular member elevated a substantial distance above said shell bottom to define a minimum depth of weak liquid thereby to prevent heat damage to said shell on any interruption of rich liquid flow into said shell without corresponding interruption of weak liquid flow from said shell, said weak liquid conduit means thereby receiving weak liquid from adjacent said shell bottom by way of said tubular member despite the elevation of said entrance end.

2. The generator of claim 1 wherein said shell has a vapor space above the liquid in said shell and said tubular member has an open upper end in said vapor space.

3. The generator of claim 1 wherein spaced rectifier plates normally immersed in said liquid are mounted on said tubular member to extend substantially across said shell.

4. The generator of claim 3 wherein said conduit means entrance end is above the lowermost one of said rectifier plates whereby said minimum depth of weak liquid in said shell is above the lowermost one of said rectifier plates.

5. The generator of claim 2 wherein at least one restricted flow orifice member is provided in said tubular member above said conduit means entrance end to retard reabsorption of vapor from said vapor space into the weak liquid within said tubular member.

6. The generator of claim 2 wherein thermoresponsive means are provided in communication with said vapor space for stopping said means for supplying heat on sensing an abnormally high temperature.

7. The generator of claim 1 wherein said shell has a vapor space above the liquid in said shell and said tubular member has an open upper end in said vapor space, spaced rectifier plates normally immersed in said liquid are mounted on said tubular member to extend substantially across said shell, and at least one restricted flow orifice member is provided in said tubular member above said conduit means entrance end to retard reabsorption of vapor from said vapor space into the weak liquid within said tubular member.

References Cited
UNITED STATES PATENTS

| | | | |
|---|---|---|---|
| 2,241,621 | 5/1941 | Shoeld | 62—497 |
| 2,550,428 | 4/1951 | Reid | 62—148 |
| 2,999,373 | 9/1961 | Steirlin | 62—497 |
| 3,177,675 | 4/1965 | Kogel | 62—148 |

LLOYD L. KING, *Primary Examiner.*